United States Patent Office 3,354,164
Patented Nov. 21, 1967

3,354,164
S-TRIAZOLO-[3,4-a] ISOQUINOLINES
AND PROCESS
John E. Francis, Pleasantville, N.Y., assignor to Geigy
Chemical Corporation, Greenburgh, N.Y., a corporation of Delaware
No Drawing. Filed Oct. 23, 1965, Ser. No. 504,093
4 Claims. (Cl. 260—288)

This invention relates to novel nitrogen-containing organic compounds and to intermediates and processes for the preparation thereof. More particularly it is concerned with s-triazolo-[3,4-a] isoquinolines.

The compounds of the present invention are characterized by the structure of the following Formula I:

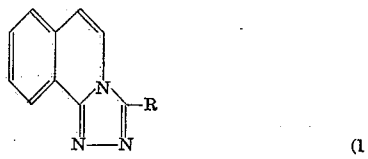

(1)

wherein R indicates hydrogen or alkyl.

By the term "alkyl" when used in the specification and appended claims is intended a branched or straight hydrocarbon chain. Illustrative of such alkyl groups are methyl, ethyl, propyl, isopropyl, butyl, isobutyl, secondary butyl, tertiary butyl, pentyl, isopentyl, hexyl and the like.

The compounds of the present invention are valuable cardiovascular agents, in particular, coronary dilating agents. For example, in the anesthetized dog, arterial blood pressure is decreased, cardiac force is increased and coronary flow is increased after administration of 3-methyl-s-triazolo-[3,4-a] isoquinoline.

These compounds may be administered parenterally or orally in any of the usual pharmaceutical forms including tablets, capsules, powders, suspensions, solutions, syrups and the like. Particularly valuable formulations include sustained release preparations which may be compounded by any of the known procedures.

The therapeutically valuable compounds of the present invention include all physiologically acceptable acid addition salts and physiologically acceptable quaternary ammonium salts of the s-triazolo-[3,4-a] isoquinolines characterized by Formula I. Such physiologically acceptable, non-toxic addition salts include those derived from organic and inorganic acids, such as, without limitation, hydrochloric, hydrobromic, sulfuric, phosphoric, methanesulfonic, acetic, lactic, succinic, malic, maleic, aconitic, phthalic, tartaric and the like acids.

The new s-triazolo-[3,4-a] isoquinolines can be obtained by the following processes:

Convenient and novel processes within the scope of this invention useful to prepare 3-methyl s-triazolo-[3,4-a] isoquinoline are, in essence:

A process for the preparation of 3-methyl s-triazolo-[3,4-a] isoquinoline which comprises treating 1-hydrazinoisoquinoline with hot acetic anhydride until cyclization is susbtantially completed and recovering said product. Alternatively, the product may be obtained by reacting acetic anhydride or an acetyl halide [1] and 1-hydrazino isoquinoline with a tertiary base with or without an inert solvent until cyclization is substantially completed and recovering said product. Examples of the tertiary bases which may be used are pyridine, quinoline and trialkylamines such as triethylamine. Examples of inert solvents which may be used are aromatic hydrocarbons such as benzene, toluene, xylene, halogenated hydrocarbons such as tetrachloroethane and chlorobenzene and ethers such as diethyleneglycol dimethyl ether, dioxane and the like.

Also contemplated by this invention is a process for the preparation of s-triazolo-[3,4-a] isoquinoline, which comprises treating 1-hydrazinoisoquinoline with hot formic acid until cyclization is substantially completed and recovering said compound.

Alternatively, these reactions may be carried out to partial completion and the cyclization completed by heating the partially cyclized product with a dehydrating agent such as phosphorous oxychloride.

The following examples serve to illustrate the present invention without limiting the same thereto:

EXAMPLE I

*s-Triazolo-[3,4-a] isoquinoline*

A mixture of 1-hydrazinoisoquinoline (4.77 g.) in 90% formic acid (20 ml.) was stirred at reflux temperature for one hour. The clear solution was evaporated to dryness in vacuo. The white solid residue was dissolved in very dilute sodium bicarbonate and treated with concentrated sodium bicarbonate solution until the pH of the solution was neutral. A white solid precipitated. The material was collected, dried and twice recrystallized from benzene. s-Triazolo-[3,4-a] isoquinoline was thus obtained in white crystals, M.P. 113–117°.

EXAMPLE II

*s-Triazolo-[3,4-a] isoquinoline methanesulfonate* s-Triazolo-[3,4-a] isoquinoline (169 mg.) was dissolved in methanol (10 ml.) and treated with methanesulfonic acid (0.1 ml.). The solution was heated for ten minutes on a steam bath, cooled and treated with dry ether to incipient crystallization. The methanesulfonate salt (300 mg.) was obtained on cooling and filtration. It melted at 201–204° C.

EXAMPLE III

*s-Triazolo-[3,4-a] isoquinoline hydrochloride* s-Triazolo-[3,4-a] isoquinoline (85 mg.) in absolute methanol (10 ml.) was treated with dry hydrogen chloride during cooling in an ice-bath. When the solution was saturated with hydrogen chloride, it was treated with dry ether. The hydrochloride precipitated in colorless crystals, M.P. 275–278°.

EXAMPLE IV

*3-methyl-s-triazolo-[3,4a] isoquinoline*

To a solution of benzene (100 ml.), pyridine (40 ml.) and acetic anhydride (24 ml.) was added under stirring 1-hydrazino isoquinoline (8 g.). A fine, pale yellow precipitate formed. The mixture was heated under reflux under exclusion of moisture for six hours and a pale yellow solution resulted. Evaporation of the solvent in vacuo afforded a white crystalline mass, which was then boiled with water until no order of pyridine or acetic acid remained. The aqueous solution was evaporated to dryness in vacuo and the residue recrystallized from benzene. The first crop (4.3 g.), M.P. 170–172° was collected and partial evaporation of the mother liquors yielded a second crop of material (2.5 g.). The combined material was recrystallized from benzene-hexane, decolorizing charcoal being used and the pure product obtained in colorless plates, M.P. 170–172°.

Calc'd C, 72.14; H, 4.95; N, 22.92. Found: C, 71.96; H, 5.10; N, 22.69.

3-ethyl-s-triazolo-[3,4-a] isoquinoline can be prepared in a similar manner by using propionic anhydride in place of acetic anhydride.

EXAMPLE V

A mixture of 1-hydrazino isoquinoline (1 g.), pyridine (10 ml.), acetyl chloride (5 ml.) and dry toluene (50 ml.)

---
[1] Such as acetyl chloride.

were heated at reflux for 16 hours. The mixture was cooled, washed with sodium carbonate solution and evaporated to dryness in vacuo. The residue was boiled with water until no smell of pyridine remained and the aqueous solution then evaporated in vacuo. The residue was recrystallized from benzene-hexane with decolorizing charcoal and then twice more without charcoal and the colorless product, M.P. 170–172°, obtained.

When the acid halides shown in Column A are substituted for acetyl chloride, the R group in the product obtained is shown in Column B.

| (A) Starting material: | (B) R= |
|---|---|
| n-Butyryl chloride | n-Propyl- |
| Iso-butyryl chloride | Iso-propyl- |
| n-Valeryl chloride | n-Butyl |
| Iso-valeryl chloride | Iso-butyl |
| n-Hexanoyl chloride | n-Pentyl |
| n-Heptanoyl chloride | n-Hexyl |

Any changes in conditions such as temperature, pressure, reaction time and quantities used obvious to those skilled in the art are considered within the scope of this invention.

What is claimed is:

1. A compound selected from those of the formula:

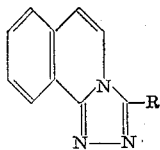

wherein R is hydrogen or alkyl; non-toxic acid addition salts thereof and non-toxic quaternary ammonium salts thereof.

2. 3-methyl-s-triazolo-[3,4-a] isoquinoline.

3. A process for the preparation of s-triazolo-[3,4-a] isoquinolines which comprises treating 1-hydrazino isoquinoline with hot acetic anhydride or hot formic acid, until cyclization is substantially complete, and recovering said s-triazolo-[3,4-a] isoquinoline.

4. A compound according to claim 1 which is s-triazolo-[3,4-a] isoquinoline.

References Cited
UNITED STATES PATENTS 2,065,879  12/1936  Ach et al. _____ 260—289
3,200,123  8/1965  Richardson et al. _____ 260—288

ALEX MAZEL, *Primary Examiner.*

D. DAUS, *Assistant Examiner.*